United States Patent [19]

Edelmayer

[11] Patent Number: 4,898,522
[45] Date of Patent: Feb. 6, 1990

[54] SYSTEM FOR COOLING THE ROTARY ENGINE ROTOR

[75] Inventor: Thomas C. Edelmayer, Mobile, Ala.

[73] Assignee: Teledyne Industries, Inc., Los Angeles, Calif.

[21] Appl. No.: 179,028

[22] Filed: Apr. 7, 1988

[51] Int. Cl.[4] .......................... F01C 1/22; F01C 21/06
[52] U.S. Cl. ...................................... 418/61.2; 418/91
[58] Field of Search .................. 418/61.2, 83, 91, 101, 418/88

[56] References Cited

U.S. PATENT DOCUMENTS

| | | | |
|---|---|---|---|
| 3,112,870 | 12/1963 | Bentele | 418/61.2 |
| 3,234,922 | 2/1966 | Froede | 418/101 |
| 3,288,119 | 11/1966 | Sparrow | 418/61.2 |
| 3,299,862 | 1/1967 | Peras | 418/91 |
| 3,690,791 | 9/1972 | Dieter | 418/91 X |
| 3,847,517 | 11/1974 | Hermes et al. | 418/91 |
| 4,424,779 | 1/1984 | Tseng | 123/237 |
| 4,486,159 | 12/1984 | Garside | 418/61.2 |
| 4,753,584 | 6/1988 | Wankel | 418/101 |
| 4,772,189 | 9/1988 | Garside | 418/91 |

Primary Examiner—John J. Vrablik
Attorney, Agent, or Firm—Gifford, Groh, Sprinkle, Patmore and Anderson

[57] ABSTRACT

An improved cooling system for a rotary engine rotor, having coolant channels provided between the rotor body and the rotor bearing race. The coolant channels interconnect coolant passages provided at each of the triangularly-shaped rotor's apices. Provided in each of the coolant passages are coolant ribs which not only facilitate heat transfer between the coolant and the rotor, but, by preferential positioning, further aid in directing the coolant into and out of the coolant channels.

16 Claims, 3 Drawing Sheets

SYSTEM FOR COOLING THE ROTARY ENGINE ROTOR

BACKGROUND OF THE INVENTION

I. Field of the Invention

The present invention relates to rotary engines, and particularly relates to an improved system for cooling such engines. By modifying conventional rotary engine rotors to increase the flow-through of coolant, improved cooling is accomplished.

II. Description of the Relevant Art

In a rotary engine, as in all engines which experience energy loss in the form of heat, cooling is required to control such heat. This cooling is provided in the form of a cooling fluid such as antifreeze or air.

Rotary engines are conventionally provided with coolant passages in each apex of the engine rotor. Coolant passes through these passages and carries off engine heat. The coolant may be discarded or cooled and recirculated.

While this design provides some cooling to the rotor, it fails to effectively provide a way of cooling the rotor bearing or the bearing race. The proper cooling of these components is critical, as improper cooling thereof results in the reduction of bearing life through premature wear.

In an attempt to overcome this disadvantage, a previously known rotor design provides for a substantially hollow rotor which has inlets and outlets for the passage of coolant therethrough. While somewhat improved cooling may be achieved by this design, it suffers from at least two disadvantages. First, the substantially hollow construction suffers from weakened structural integrity because the axial strength is reduced. Second, this design still fails to provide for the continuous flow of coolant applied directly to that region which most requires temperature control, the bearing race itself, particularly between the bearing race and the hottest portion of the rotor, the combustion chamber.

SUMMARY OF THE INVENTION

The present invention provides a rotor for a rotary engine. The rotor is of a generally equilateral triangular shape and has an outer peripheral wall and an inner wall defining a central annular open portion of generally circular shape. One or more recessions are defined in each apex of the rotor body forming axial cooling passages thereby. Within each axial cooling passage is provided one or more cooling ribs extending in a generally axial manner. Within the central annular open portion is fitted the bearing race, which may be either of one piece or multiple piece construction. The bearing race provides support for the main rotor bearing fitted between the bearing race and the drive shaft of the engine. For cooling, coolant channels are provided between the bearing race and the rotor body, thereby providing coolant directly to the bearing race, particularly in the regions near the combustion chamber. The coolant channels interconnect the axial cooling passages.

By the afore-described means, efficient cooling of the rotor bearing race and hence cooling of the rotor bearing may be achieved at low cost and without the provision of additional moving parts. This cooling extends bearing and engine seal life significantly.

DETAILED DESCRIPTION OF THE PREFERRED EMBODIMENTS

Figure 1:
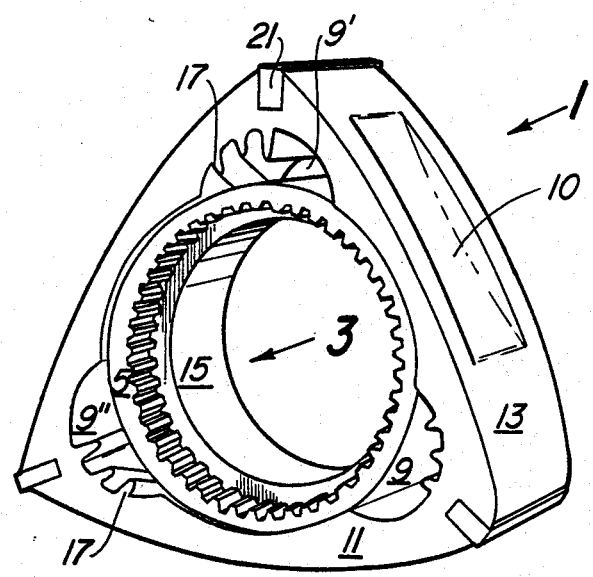
FIG. 1 is a perspective view of a rotary engine rotor according to the present invention.

FIGS. 1 through 6 illustrate preferred embodiments of the present invention. Referring to FIG. 1, there is shown a first preferred embodiment according to the present invention. Preferably there is provided a substantially equilateral triangularly shaped rotor, generally indicated by 1. While the degree of peripheral wall bulge may vary, the rotor 1 well represents the typical shape of a rotary engine rotor. The rotor 1 includes a three-sided rotor body 11, having an outer peripheral wall 13 with a combustion chamber 10 defined in each side of the body 11 and an inner wall (not shown) defining a central annular open portion. Fitted within the rotor body 11 is a gear-bearing race assembly, generally indicated by 3, which preferably includes a bearing race 15 and a gearing 5. The bearing race 15, while shown in FIG. 1 as being of one piece, continual ring construction, can alternately be multi-pieced, and may, for example, comprise three separate pieces FIG. 6, each piece provided on the inner wall of the rotor body 11.

Also defined in rotor 1 are three coolant passages including a first coolant passage 9, a second coolant passage 9', and a third coolant passage 9" which are each substantially of semicircular shape and are open from side to side relative to the axial rotation of the rotor 1 and which are further open to the gear-bearing race assembly 3. The preferred coolant may be either a liquid or a gas (not shown). Preferably provided within each of the coolant a passages 9, 9', 9" are coolant fins 17 which may be configured to enhance the direction and intensity of coolant flow as preferred.

Figure 2:
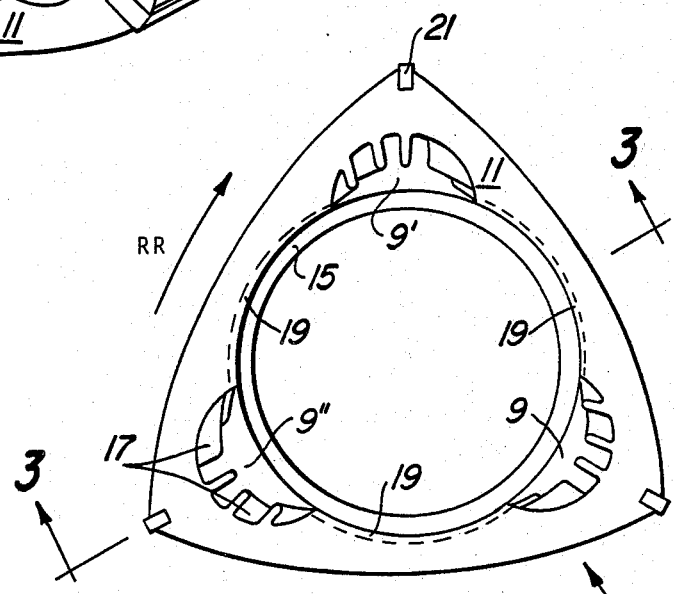
FIG. 2 is an end elevation view of a rotor in accordance with a preferred embodiment of the present invention.
Figure 6:
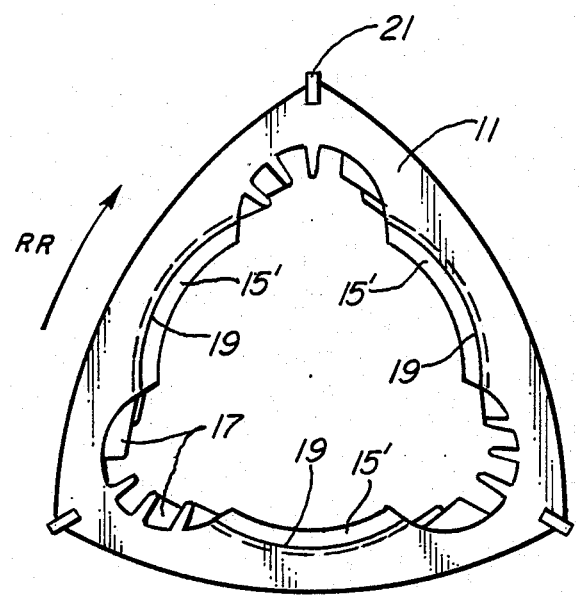
FIG. 6 is an elevation view of a rotor in accordance with an alternate embodiment of the present invention.

Referring now to FIG. 2, there is shown a side view of the rotor 1. According to the first embodiment, direction of rotor rotation is illustrated by arrow RR. The configuration of the rotor body 11 may be more readily seen by this view, which clearly reveals seals 21 and the particular configuration of the coolant fins 17. As can be readily seen, the coolant fins 17 are strategically configured according to a first preferred embodiment to enhance the flow-through of coolant, as will be more fully explained below. According to this embodiment, the bearing race 15 is of one piece construction. Alternatively, instead of a one-piece construction of the bearing race 15 as illustrated in FIG. 2, three substantially semicircular bearing race inserts 15' may be provided as illustrated in FIG. 6. With reference back to FIG. 2, illustrated by shadow lines are coolant channels 19 which are in fluid communication with the coolant passages 9, 9', 9" thereby providing the flow-through of coolant therethrough.

Figure 3:
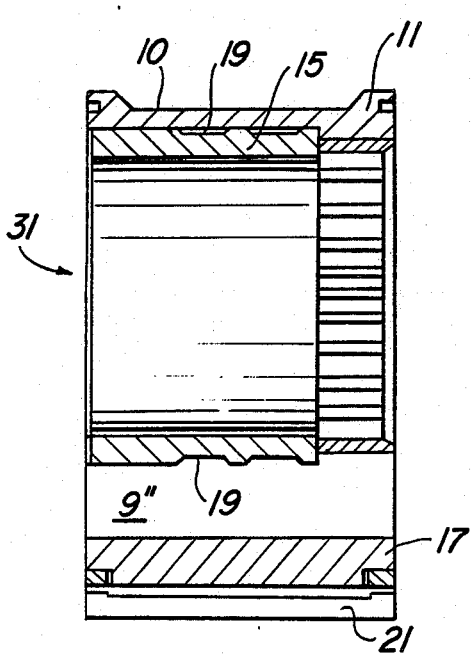
FIG. 3 is a section through line 3—3 of FIG. 2, taken parallel to the axial rotation of the rotor.

The side-by-side spaced relationship of the coolant channels 19 can be more readily seen in FIG. 3 which shows a section through line 3—3 of FIG. 2. A main bearing assembly generally indicated by 31 can also be easily seen in its relation to the rotor body 11 generally, and to the bearing race 15 specifically. The set of coolant channels 19 and their proximity to the combustion chamber 10 shown at the upper end of the embodiment as illustrated in FIG. 3 interconnect the first coolant passage 9 with the second coolant passage 9', whereas the set of coolant channels 19 shown at the lower end of the embodiment illustrated in FIG. 3 open into the coolant passage 9" above and below the plane of the section illustrated. One of the cooling fins 17 is visible in section in third coolant passage 9". A seal 21 is also visible in section.

Figure 4:
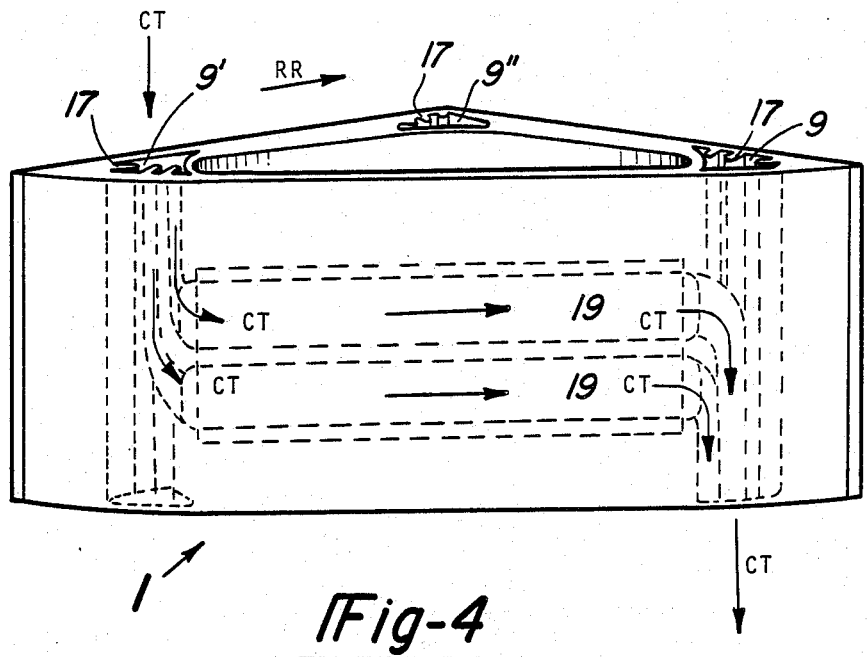
FIG. 4 is a perspective view of a preferred embodiment of the present invention showing shadow lines of the coolant channels and the direction of coolant flow.

Referring now to FIG. 4, a perspective view of the rotor 1 is shown with shadow lines to illustrate the flow-through passage of coolant. The direction of coolant flow is indicated by arrows CT. According to the first embodiment, direction of rotation is illustrated by arrow RR.

In the movement of rotation direction RR, coolant alternatingly enters the coolant passages 9, 9', 9" from a coolant reservoir (not shown) located in the rotary engine housing (not shown). Once in the coolant passages 9, 9", 9", the coolant is preferentially vented into the coolant channels 19, directed by means of the coolant fins 17. Centrifugal force and/or differential pressure accelerates the movement of coolant through the coolant channels 19, thereby maximizing convective heat transfer. The heated coolant exits into the adjacent coolant passage from the channels 19 (according to the illustrated embodiment, entering the first coolant passage 9, exiting the third coolant passage 9"; entering the third coolant passage 9", exiting the second coolant passage 9'; entering the second coolant passage 9', exiting the first coolant passage 9), and is taken away from the rotor 1 through a heated coolant receptacle (not shown) located in the rotary engine housing (not shown) to be discarded or cooled and recirculated.

As an alternative, second embodiment (not shown) where a gas, particularly air, is used as a coolant, the coolant channels and the cooling fins may be configured to function as a centrifugal forced blower. In addition to providing rotor cooling, this arrangement would facilitate supercharging of air used for the air/fuel ignition mixture.

Figure 5:
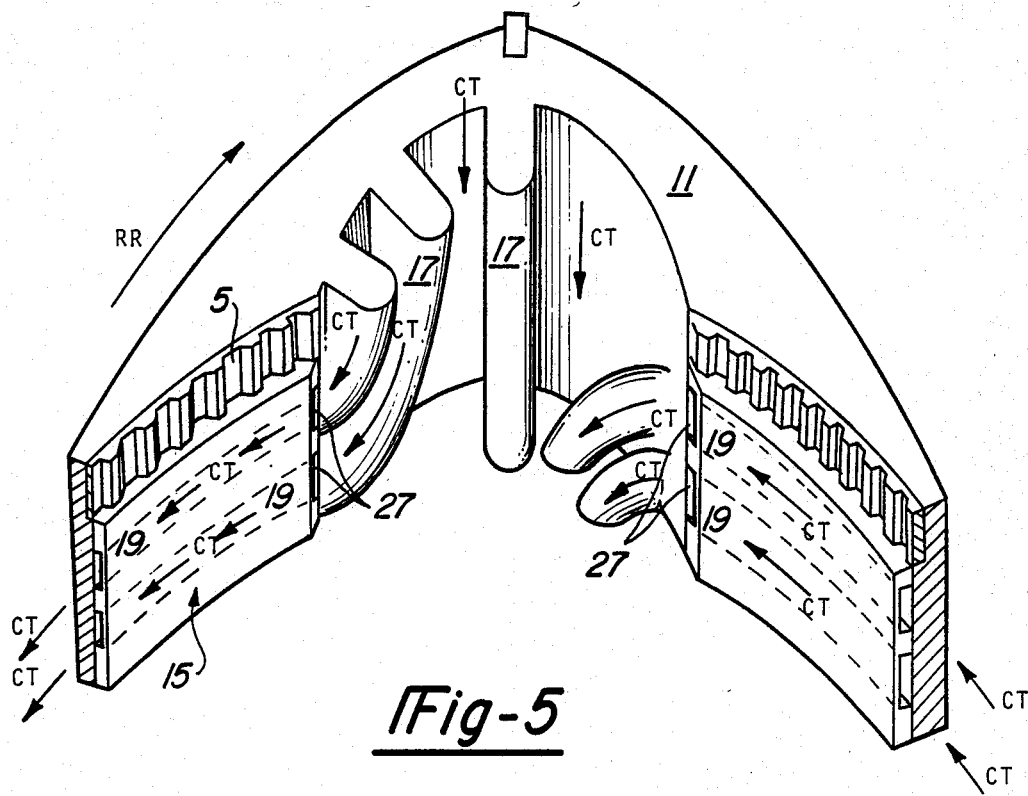
FIG. 5 is a cut-away perspective view of substantially one apex of a preferred embodiment showing shadow lines of the coolant channels and the direction of coolant flow.

By way of further illustration of the first embodiment of the present invention, FIG. 5 provides a detailed cut-away perspective view of substantially one apex of a rotor according to the present invention. According to the embodiment, there is provided the rotor body 11 having the bearing race 15 and the gearing 5 fitted to the inner walls (not shown) of the body 11. The coolant fins 17 are configured to enhance the passage of coolant into and out of the coolant channels 19, shown in shadow lines. Preferably coolant vents into or out of, as the case may be, the coolant channels 19 via the coolant vents 27. The arrows CT illustrate the direction of coolant travel within and through the rotor body 11, while arrow RR indicates rotor rotation.

While the coolant fins 17 are preferably configured as illustrated, it must be understood that other efficient configurations are possible utilizing the concepts discussed hereinabove.

The present invention is not restricted to the particular structures and examples described above and illustrated in the attached drawings. Various modifications and variations can be made in the described structures by those skilled in the art without exceeding the scope of the invention as claimed hereinbelow.

I claim:

1. A polygonal rotor for rotary engines comprising:
  a generally equilateral, triangularly-shaped rotor body;
  means for supporting a rotor bearing in said rotor body;
  said rotor body having a central annular open portion of generally circular shape and off-axis semi-circular annular open portions provided substantially through each apex of said rotor body to act as a coolant passage;
  said means for supporting a rotor bearing being fittable within said central annular open portion of said rotor;
  said rotor being further provided with one or more coolant channels fluidly interconnecting said coolant passages to thereby allow the through passage of coolant therebetween;
  said coolant channels being defined between said means for supporting a rotor bearing and said central annular open portion of said rotor whereby coolant directly contacts said means for supporting a rotor bearing.

2. A polygonal rotor according to claim 1, wherein said coolant passages are provided with one or more ribs configured so as to provide the fluid movement of coolant through said coolant channels in a direction opposite that of the direction of rotation of said rotor.

3. A polygonal rotor for rotary engines comprising:
  a polygonal rotor body of generally equilateral, triangular shape having, in an axially transverse plane relative to the rotation of said rotor, an outer peripheral wall, and an inner wall defining a central annular open portion, said inner wall having one or more recessions defined generally in each apex of said rotor body forming axial cooling passages therethrough, each of said coolant passage provided with one or more cooling ribs extending in a generally axial manner;
  one or more bearing race inserts substantially engaged with the non-recessed portions of said rotor body, said inserts providing a bearing race for supporting one or more bearing assemblies;
  said rotor further having, in an axially transverse plane relative to the rotation of said rotor, one or more coolant channels defined between said one or more bearing race inserts and said rotor body whereby coolant directly contacts said one or more bearing race inserts to enhance cooling thereof; and
  each of said coolant channels fluidly communicating one cooling passage with an adjacent coolant passage thereby allowing for the fluid passage of coolant therebetween.

4. A polygonal rotor according to claim 3, wherein said coolant is a liquid.

5. A polygonal rotor according to claim 3, wherein said coolant is a gas.

6. A polygonal rotor according to claim 3, wherein one or more of said ribs are obliquely provided relative to said axially transverse plane so as to direct coolant toward and into one end of each of said channels and to direct coolant out of and away from the other end of each of said channels.

7. A polygonal rotor according to claim 6, wherein said ribs are positioned so as to provide the movement of coolant through the coolant channels in a direction opposite that of the direction of rotation of said rotor.

8. A polygonal rotor according to claim 3, wherein one bearing race insert is provided, said insert being one piece and substantially circularly-shaped and having a central annular open portion.

9. A polygonal rotor according to claim 1, wherein three substantially semicircular bearing race inserts are provided, with one each of said inserts being substantially engaged with one each of said non-recessed portions of said rotor body.

10. A polygonal rotor according to claim 1, wherein said rotor body is of one piece construction.

11. A polygonal rotor for rotary engines comprising:
a rotor body;
means for supporting a rotor bearing in said rotor body;
said rotor body being of generally equilateral, triangular shape and having, in an axially transverse plane relative to the rotation of said rotor, an outer peripheral wall, an inner wall defining a central annular open portion of generally circular shape, said inner wall having substantially semi-circular coolant passages disposed through each apex of said rotor body, each of said coolant passages being provided with one or more coolant ribs;
said means for supporting said rotor bearing being fittable within said central annular open portion of said rotor body; and
said rotor being further provided with one or more coolant channels fluidly interconnecting said coolant passages to thereby allow the through passage of coolant therebetween, said one or more coolant channels being defined between said means for supporting a rotor bearing and said central annular open portion of said rotor body whereby coolant directly contacts said means for supporting a rotor bearing.

12. A polygonal rotor according to claim 11, wherein said coolant is a liquid.

13. A polygonal rotor according to claim 11, wherein said coolant is a gas.

14. A polygonal rotor according to claim 11, wherein one or more of said ribs are obliquely provided relative to said axially transverse plane so as to direct coolant toward and into one end of each of said channels and to direct coolant out of and away from the opposite end of said channels.

15. A polygonal rotor according to claim 14, wherein said ribs are configured so as to provide fluid movement of coolant through said coolant channels in a direction opposite that of the direction of rotation of said rotor.

16. A polygonal rotor according to claim 11, wherein said rotor body is of one piece construction.

* * * * *